(No Model.) 2 Sheets—Sheet 1.

J. W. TOLAR & B. D. LANGSTON.
CAR COUPLING.

No. 524,919. Patented Aug. 21, 1894.

WITNESSES:
William Goebel.
C. Sedgwick

INVENTORS
J. W. Tolar
B. D. Langston
BY Munn & Co.
ATTORNEYS.

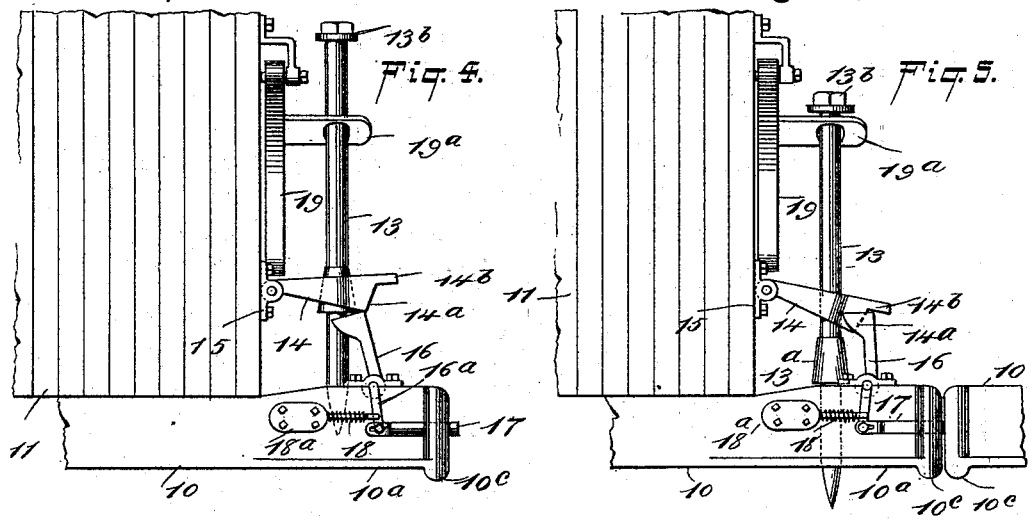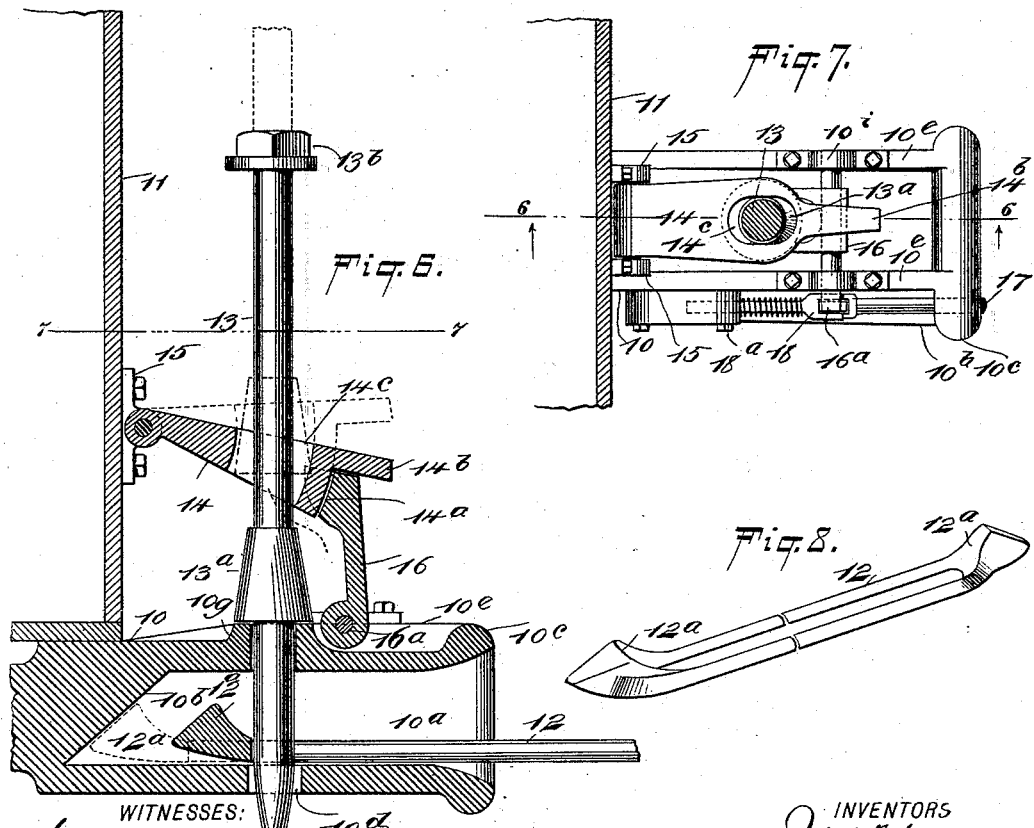

UNITED STATES PATENT OFFICE.

JAMES W. TOLAR, OF WILKSBURG, AND BENJAMIN D. LANGSTON, OF GOSS, MISSISSIPPI.

CAR-COUPLING.

SPECIFICATION forming part of Letters Patent No. 524,919, dated August 21, 1894.

Application filed March 15, 1894. Serial No. 503,772. (No model.)

*To all whom it may concern:*

Be it known that we, JAMES W. TOLAR, of Wilksburg, in the county of Covington, and BENJAMIN D. LANGSTON, of Goss, in the county of Marion, State of Mississippi, have invented a new and useful Car-Coupling, of which the following is a full, clear, and exact description.

Our invention relates to improvements in car couplings of the link and pin type, and has for its objects, to provide a coupling of the character mentioned, which will be automatic in action in the matter of coupling two cars having the improvement, and that will be adapted for release from the side or top of a car that is coupled to another car by the improved couplings.

To these ends, our invention consists in the construction and combination of parts, as is hereinafter described and claimed.

Reference is to be had to the accompanying drawings, forming a part of this specification, in which similar figures of reference indicate corresponding parts in all the views shown.

Figure 1:
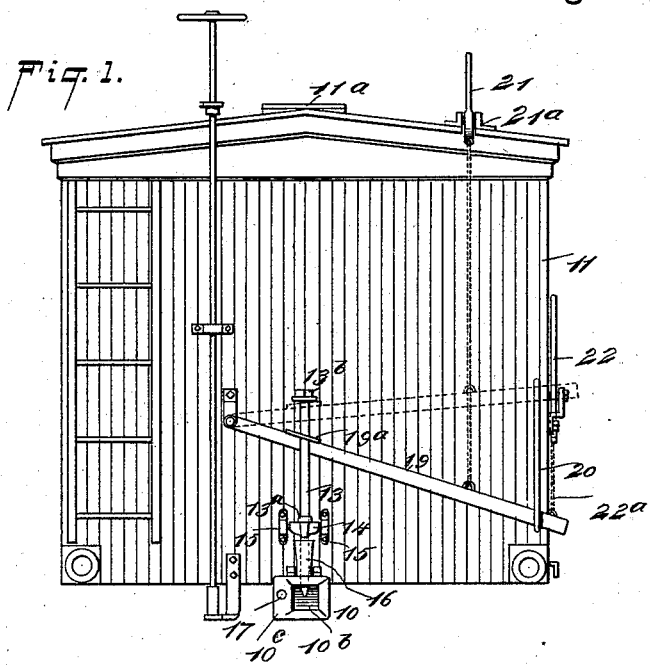
Figure 2:
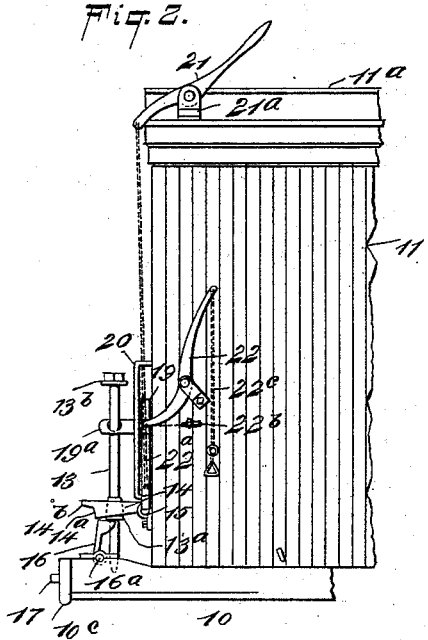
Figure 3:
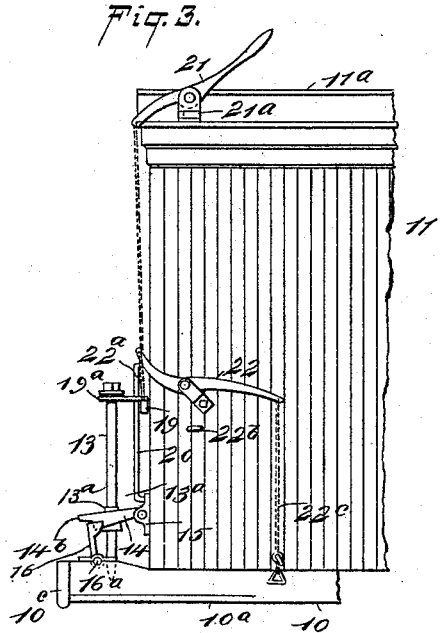

Figure 1 is an end view of a car having the improvement applied. Fig. 2 is a side view of an end of a car showing features of the improvement. Fig. 3 is a similar view showing the parts of the coupling device shown in Fig. 2, in a different adjustment. Fig. 4 is a side view of the end of a car, taken oppositely from that represented in Figs. 2 and 3, and showing other details of construction of the improved car coupling. Fig. 5 represents the parts of the improvement shown in Fig. 4, differently adjusted. Fig. 6 is an enlarged sectional side view on the line 6—6 in Fig. 7. Fig. 7 is a partly sectional plan view, on the line 7—7 in Fig. 6; and Fig. 8 is an intermediately broken perspective view of a coupling link adapted for use with the improved couplings.

The drawhead 10 is preferably cast into form, and comprises an elongated metallic block that is substantially rectangular in cross-section, and at its rear end (not shown) is secured upon the car body 11, so as to be spring-cushioned in the usual manner. The portion of the drawhead that projects beyond the end of the car body is rectangularly recessed of a suitable depth, which recess $10^a$ terminates at its inner end in a rearwardly and downwardly inclined wall $10^b$, as shown in Fig. 6.

The forward end of the drawhead 10 is flared on all its sides to adapt its recess to readily receive the end of an elongated link 12, that will be further described, a heavy bead $10^c$, being formed on the exterior surface of said flared end. At a proper distance from the outer end of the drawhead, a vertical perforation $10^d$ is formed in its top and bottom walls at their transverse centers, for the reception of a coupling pin 13, that is pointed on the lower end to permit its free insertion. The top wall of the drawhead 10 is preferably recessed on the upper side to remove a portion of the material, leaving stiffening beads along the side edges, as indicated at $10^e$ in Figs. 6 and 7, and an integral collar $10^g$, that is raised around the perforation $10^d$, so as to thicken the top wall at that point.

The coupling pin 13 is mainly cylindrical on its body, which is of considerable length, and at a proper distance from the pointed lower end has a head or enlargement $13^a$ formed on it, that is designed to rest on the collar $10^g$ when the pin is in lowered adjustment for the coupled connection of the link 12, with the drawhead, the coupling pin then extending through the top and bottom walls of the latter, as represented in Fig. 6. A removable head $13^b$ is also provided, that is screwed on top of the pin.

Upon the vertical end wall of the car body 11, at a suitable point above the drawhead 10, the latch piece 14, is pivotally secured by its loose connection with the bracket boxes 15, that are affixed upon the said wall. The latch piece 14, comprises preferably a metal block which is thickened toward its outer end to a point near said end, where the block is cut away to produce a shoulder $14^a$ on it, the toe $14^b$, that extends outwardly from this shoulder being of a reduced breadth and thickness as compared with the main portion of the latch piece. The latch piece is longitudinally slotted at its transverse center a short distance rearwardly of the shoulder $14^a$, to permit the portion of the coupling pin 13, that extends above the head piece $13^a$, to freely slide in said slot $14^c$ and the latch piece to receive a proper vertical vibration. As indicated by full and dotted lines in Fig. 4, the head piece 13ª is rendered coniform, tapering toward the upper end so as to occupy the slot 14ᶜ, when parts are adjusted to effect such a connection of the head with the latch piece.

A locking dog 16, is pivoted by its lower end upon the upper side of the drawhead, preferably this loose connection is effected as plainly shown in Figs. 6 and 7. A pintle shaft 16ª passing through the dog body has its ends loosely engaged with the boxes 10ⁱ, that are attached to the side beads 10ᵉ of the drawhead. The dog 16 projects upwardly on the median line of the drawhead, of a correct length to adapt its upper end to engage with and support the latch piece 14. To this end, the upper part of the dog is thickened between its front and rear walls, forming a rearwardly projecting head that is vertically notched at the transverse center, so as to produce two equally thick jaws which are sufficiently separated to admit the toe 14ᵇ between them, the relative thickness of the latter allowing it to freely drop into place when the parts are adjusted to effect such a locking connection, shown in Figs. 3, 5, 6 and 7, the terminal end of the latch piece then resting on top of the dog.

Upon one side wall of the drawhead 10, a rib 10ʰ is projected outwardly along the lower edge, this stiffening rib being extended rearwardly from the side bead 10ᵉ, that on this wall of the drawhead is increased in outward thickness. The pintle shaft 16ª is outwardly extended on the side of the drawhead having the rib along its lower edge, and is downwardly projected of a proper length to have its lower terminal pivoted upon a slide bolt 17, said bolt having a loose engagement near its front end with a perforation made to receive it in the side bead 10ᶜ. A pusher rod 18, is supported to slide longitudinally of the drawhead by a bracket box 18ª, said rod being forwardly pivoted upon the depending portion of the pintle shaft 16ª, and springpressed outwardly by an encircling coiledspring that has its ends in enforced contact with the front end wall of the box 18ª, and the forked enlargement of the pusher rod, as clearly shown in Fig. 7.

The notched upper end of the dog 16 is adapted to loosely embrace the cylindrical body of the coupling pin 13, and afford support for the latter if the pin is sufficiently elevated to rock the latch piece 14 upwardly, so as to permit the pusher rod 18 to press the dog toward the pin below the head piece 13ª, and provide a seat for said head piece, as shown in Fig. 4. When the notched end of the dog 16 is rocked into contact with the pin 13, below the head piece 13ª, the relative adjustment of parts thereby effected, will cause the slide bolt 17 to extend a suitable degree beyond the front face of the bead 10ᶜ, as shown in Figs. 2, 4 and 7. Above the latch piece 14, the body of the coupling pin 13 is loosely engaged with the vertically perforated arm 19ª, that is outwardly projected from the lever 19, which is pivoted by its inner end upon the end wall of the car, as shown in Figs. 1, 4 and 5.

The transverse lever 19, comprises a flat bar, of sufficient length to permit its outer end to extend diagonally a short distance beyond the side wall of the car. A vertical guide piece 20 is provided for the lateral support of the lever 19 at its outer end, this guide being formed of a metal bar bent at right angles in the same direction near each end, the feet thus produced at each end of the guide piece affording means to secure it upon the end wall of the car, in a vertical position near the side edge of the same, the lever passing through the opening thus afforded between the piece 20 and end wall of the car, so as to be prevented from outward movement, while its free vibration in a vertical plane is permitted.

The portion of the coupling pin 13, that extends above the arm 19ª when the pin is completely depressed to couple a link to the drawhead, is so proportioned in length, that the lever 19, if elevated to impinge on the upper terminal of the guide piece 20 will by reason of its arm 19ª engaging with the enlargement or head 13ᵇ on the upper end of the coupling pin, elevate the latter a correct distance, so as to release a link that has been coupled to the drawhead.

On the car roof, between the center runboard 11ª and side of the car toward which the lever 19 is projected, and at any preferred point, the tripping lever 21 is supported to rock, by a bracket frame 21ª or other equivalent means. This lever that projects at one end over the end wall of the car body, is flexibly connected by said end with the lever 19, so that the depression of the rear end of the tripping lever will elevate the outer end of the transverse lever 19, as indicated by dotted lines in Fig. 1, the elevation of the said lever serving to lift the coupling pin 13.

On the side of the car body toward which the lever 19 is extended, a rocking lever 22 is pivoted intermediately of its ends, one terminal projecting in advance of the end wall of the car when the lever is nearly horizontal, so as to be adapted for a flexible connection with the outer end of the transverse lever 19, a chain 22ª being preferably employed for such purpose, the connection of the pendent end of said chain being produced with a hook on the latter, that may also be connected with a staple 22ᵇ, when the rocking lever is detached from the transverse lever and is to be held in an upright position, as indicated by a dotted line in Fig. 2.

The coupling link 12, which is shown detached in Fig. 8, consists of an elongated longitudinally slotted bar having its solid ends 12ª upwardly and outwardly curve-bent, and sloped on their top faces outwardly and downwardly, so that when the link is slid within the recess of the drawhead until the inserted end has contact with the sloped inner end wall of the recess, the engagement of the sloped face on the link end with the inclined rear wall of the recess, as indicated by dotted lines in Fig. 6, will maintain the link in a horizontal position.

In service, when two or more cars having the improvement are to be coupled together, one of the drawheads 10 is made to receive the coupling link 12, and support it projected therefrom in a horizontal plane, the pin 13 being dropped so as to engage both the top and bottom wall of the drawhead, the latch piece 14 and locking dog 16, being then in locked adjustment, as indicated in Fig. 5, which will retain the slide bolt 17, retracted. The car having a mating car coupling is now made to approach the one from which the link is projected, and the latter will freely enter the approaching drawhead on which the coupling pin 13, is held elevated by the dog 16, as shown in Fig. 4, the slide bolt on this drawhead being in a projected condition owing to the relative adjustment of attached parts, as before explained.

When the two drawheads have contact, the projecting slide bolt 17 will be pressed rearwardly, which will rock the dog 16 forwardly at its upper end; this will release the pin 13, and allow it to drop by its gravity and so effect a completed connection of the two drawheads.

It will be seen that a trainman on the car roof, can by manipulating the tripping lever 21, draw the coupling pin upwardly so as to release a coupled link, and at the same time change the adjustment of the latch piece and locking dog so that the latter will be caused to support the pin 13 in an elevated position, the slide bolt 17, being simultaneously projected from the front end of the drawhead, so that the several parts of the improved coupling will be set for re-coupling with another device of a like construction. Any desired number of cars that are furnished with the improved coupling at each end, may be automatically and reliably connected by arranging their parts as has been explained, and then pushing them together by power applied at one end of the train.

Should it be desired to detach two cars having the improvement, from the ground at one side of a car, the rocking lever 22, is used, and to facilitate its manipulation, a chain 22$^c$ or other flexible piece is attached by one end to the inner end of the rocking lever so as to hang pendent. The lower terminal of the chain has a handle loop or ring secured to it, for the trainman to grasp when the upper end of the rocking lever is to be drawn down into the position shown in Fig. 3, where it may be detachably secured by engaging a link or ring in the chain with a hook on the lower part of the car side wall, such an adjustment being serviceable when it is desired to lift the coupling pin far enough to release a coupling link from the drawhead, and retain the slide bolt 17 from projection.

By the partial upward vibration of the transverse lever 19, that is effected by the rocking lever as just mentioned, the car having its couplings so adjusted, may be left on a siding and be shifted along the latter by the impact of another moving car, and avoid coupling with said car that may have a link projecting from it, the lifting of the transverse lever so as to cause the upward vibration of the latch piece 14, effecting a release of the slide bolt 17, and a drop of the coupling pin, as before described.

It is claimed for this device that it is simple, practical, and convenient in service, being automatic as to coupling, and safe to release from the roof of a car, or at the side of the coupled cars, as may be preferred.

Having thus described our invention, we claim as new and desire to secure by Letters Patent—

1. The combination, with a recessed drawhead vertically perforated near the front, of a coupling pin having an upper head and an intermediate head, means to lift the pin by the upper head, a vibratile locking dog engaging the intermediate head, and mechanism to rock the dog outwardly when actuated from the front of the drawhead, substantially as described.

2. The combination, with a recessed drawhead, vertically perforated near the front, of a pin having an intermediate head, a vibratile lever adapted to lift the pin by its upper head, a locking dog pivoted on the drawhead and engaging the intermediate head, and mechanism arranged to outwardly rock, to trip said dog by the movement of a slide-bolt from the front of the drawhead, substantially as described.

3. The combination, with a car, a recessed drawhead vertically perforated near the front, and a coupling pin having an upper head and an intermediate head, of a transversely supported vibratile lever, an arm on said lever loosely engaging the pin and its upper head, and a latching device engaging the intermediate head at its lower end and adapted for adjustment to support the pin by an upward movement of the transverse lever, substantially as described.

4. The combination with a car, a forwardly recessed drawhead vertically perforated near the front, and a coupling pin having an upper head and an intermediate upwardly tapered head, of a transverse lever pivoted near one end on the car, an outwardly extended and perforated arm on the lever loosely engaging said pin and impinging its upper head, a locking dog engaging the under side of the intermediate head, and a device on the car roof flexibly connected with the lever, substantially as described.

5. The combination with a car, a forwardly recessed drawhead vertically perforated near the front, a coupling pin having an upper head and an intermediate tapering head, and a latching device on the drawhead and car, engaging the intermediate head and tipped by vibration of a dog forming part of said latching device, and a lifting device for the pin, which engages the upper head of the pin and causes a vibration of the dog, substantially as described.

6. The combination with a car, a forwardly recessed drawhead vertically perforated near the front, a coupling pin having an upper head and an upwardly tapered intermediate head, a slotted latch block pivoted on the car end, and through which the pin passes, and a locking dog vibratile on the drawhead and engaging the intermediate head of the pin, of a transverse pivoted lever, a lifting lever on the upper part of the car, and a flexible connection between an end of the lifting lever and the transverse lever, substantially as described.

7. The combination with a car, a forwardly recessed drawhead vertically perforated near the front, a coupling pin having an upper head and an upwardly tapered intermediate head, and a latching device adapted for adjustment by the upward movement of the pin, whereby said pin is maintained in an elevated condition, of a transverse pivoted lever, a lifting lever on the side of the car and flexibly connected with the transverse lever, and a tripping device for the latching device, adapted for actuation by the inward movement of a slide bolt on the front end of the drawhead, substantially as described.

JAMES W. TOLAR.
BENJAMIN D. LANGSTON.

Witnesses:
   JOHN APPLEWHITE,
   WARREN T. WILLOUGHBY.